(12) United States Patent
Sotoyama et al.

(10) Patent No.: US 9,016,767 B2
(45) Date of Patent: Apr. 28, 2015

(54) VEHICLE BODY FRONT SECTION STRUCTURE

(71) Applicant: Toyota Jidosha Kabushiki Kaisha, Toyota-shi (JP)

(72) Inventors: Yoshitaka Sotoyama, Nissin (JP); Shintaro Kitakata, Nissin (JP); Kenjiro Yamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/109,022

(22) Filed: Dec. 17, 2013

(65) Prior Publication Data

US 2014/0167450 A1    Jun. 19, 2014

(30) Foreign Application Priority Data

Dec. 19, 2012   (JP) ................. 2012-277236

(51) Int. Cl.
*B62D 25/08* (2006.01)
*B62D 21/15* (2006.01)

(52) U.S. Cl.
CPC .................. *B62D 21/152* (2013.01)

(58) Field of Classification Search
USPC ............. 296/187.09, 187.1, 203.02
See application file for complete search history.

(56) References Cited

U.S. PATENT DOCUMENTS 6,994,374 B2 *  2/2006  Miyasaka ................. 296/187.09

FOREIGN PATENT DOCUMENTS

| JP | 2008-213739 |   | 9/2008 |
|----|----|----|----|
| JP | 2008-309674 |   | 12/2008 |
| JP | 2010-132122 | A | 6/2010 |
| JP | 2012-166743 |   | 9/2012 |
| JP | 2012-214211 | A | 11/2012 |
| JP | 2012-228907 |   | 11/2012 |

OTHER PUBLICATIONS

J.I.I.I Journal of Technical Disclosure No. 2011-504318, Published on Nov. 1, 2011, 3 pages.
JP Office Action dated Feb. 10, 2015 in Japanese Application No. 2012-277236.

* cited by examiner

*Primary Examiner* — Joseph D Pape
(74) *Attorney, Agent, or Firm* — Oblon, Spivak, McClelland, Maier & Neustadt, L.L.P.

(57) ABSTRACT

A vehicle body front section structure includes a projecting member that is provided at an outside wall of a front side member further to a vehicle width direction inside than a front wheel and at a location separated in the vehicle body front-rear direction from a front bumper reinforcement, such that the projecting member projects out further towards the vehicle width direction outside than the outside wall. The vehicle body front section structure is further provided with an assistance portion that is formed to the outside wall, and that assists movement of the rear end portion of the projecting member towards the vehicle width direction inside upon input of load to the projecting member.

5 Claims, 9 Drawing Sheets

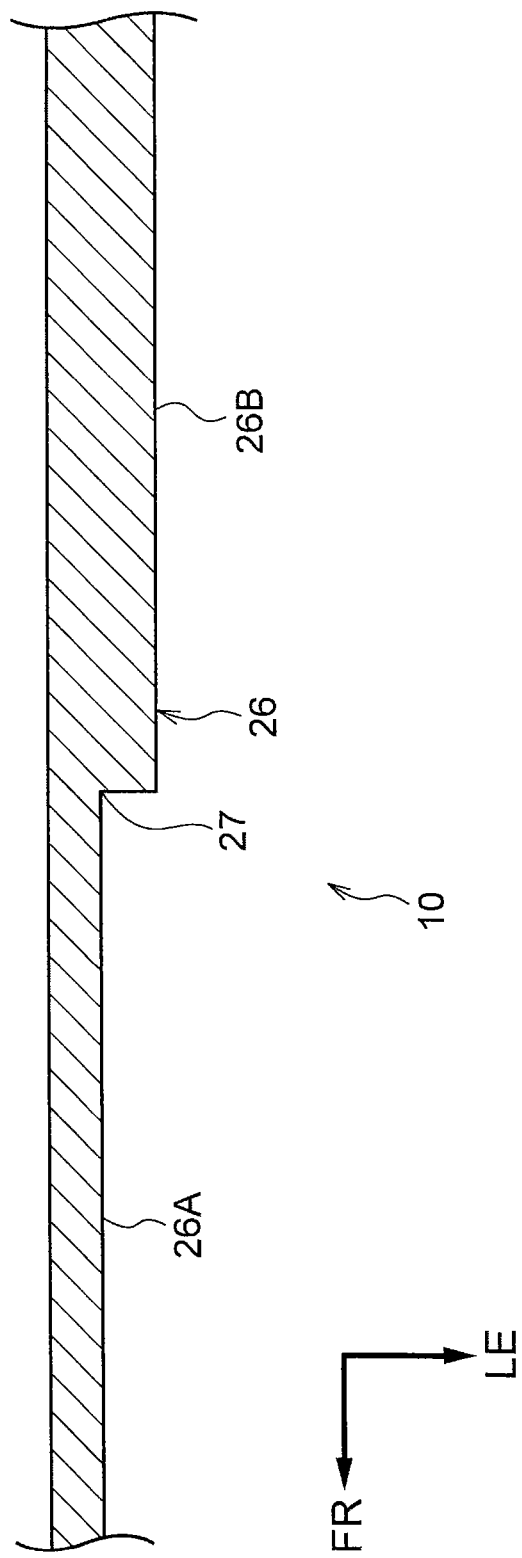

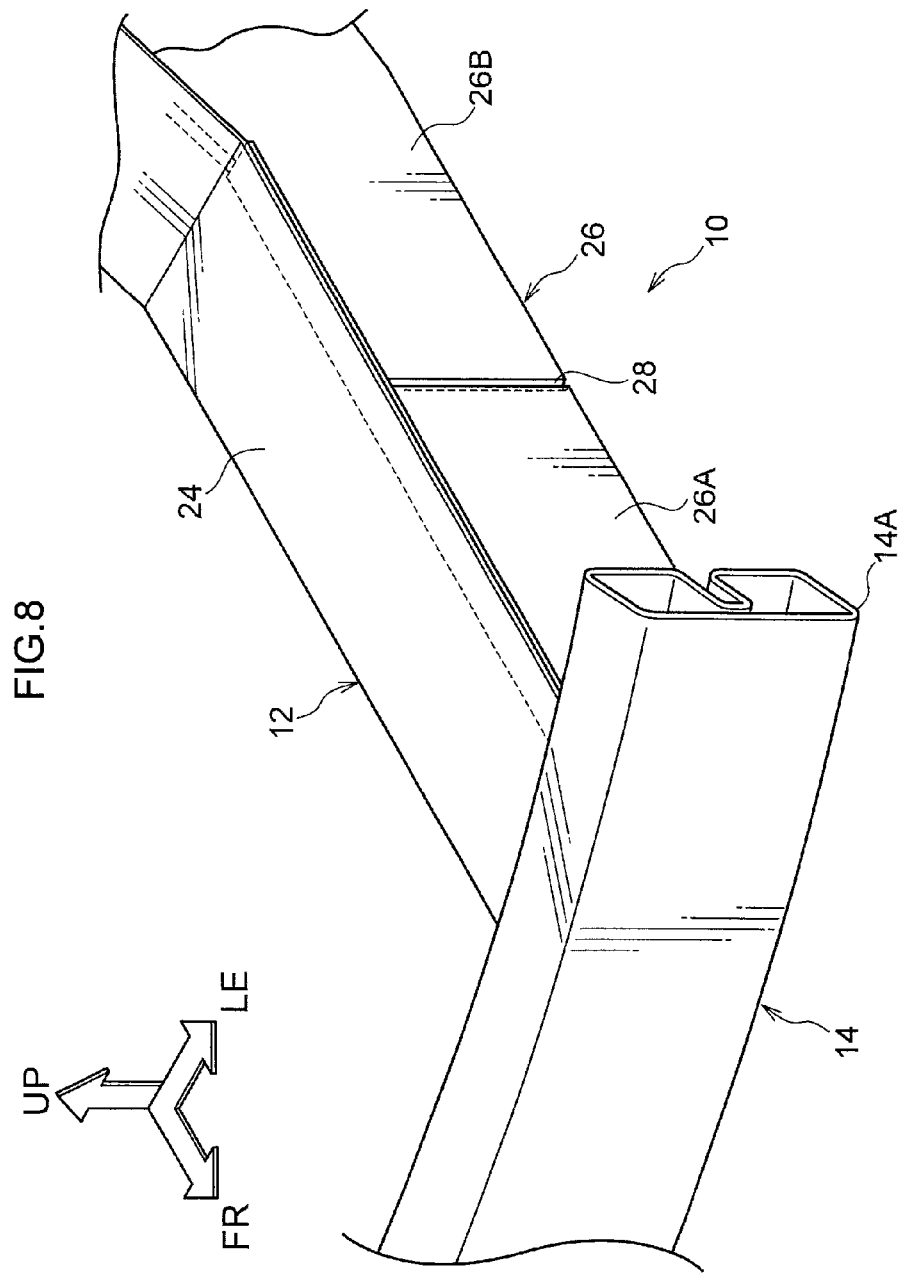

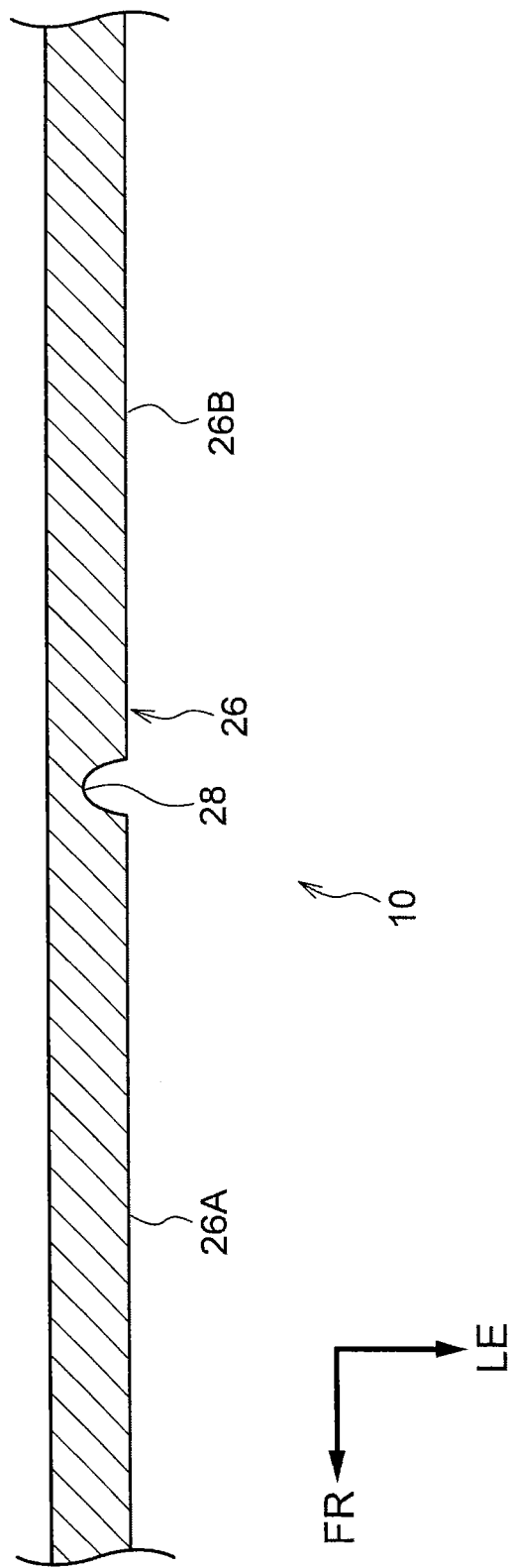

VEHICLE BODY FRONT SECTION STRUCTURE

CROSS-REFERENCE TO RELATED APPLICATION

This application is based on and claims priority under 35 USC 119 from Japanese Patent Application No. 2012-277236 filed on Dec. 19, 2012, the disclosure of which is incorporated by reference herein.

BACKGROUND

1. Technical Field

The present invention relates to a vehicle body front section structure.

2. Related Art

Vehicle body front section structures have been proposed in which a reinforcement extension is provided to a side portion of a front bumper reinforcement, such that in the event of a frontal collision (a small overlap collision) further to the vehicle width direction outside than a front side member, the reinforcement extension contacts the front side member, thereby generating lateral force (force towards the opposite side to the collision side in the vehicle width direction) with respect to the vehicle (see for example Japanese Patent Application Laid-Open (JP-A) No. 2008-213739).

SUMMARY

In order to suppress deformation of the vehicle in the event of a frontal collision (small overlap collision) further towards the vehicle width direction outside than the front side member, a configuration in which lateral force with respect to the vehicle is generated in an efficient manner is desirable.

Accordingly, an object of the present invention is to obtain a vehicle body front section structure capable of generating lateral force with respect to a vehicle in an efficient manner in the event of a small overlap collision.

In order to achieve the above object, a vehicle body front section structure of a first aspect of the present invention includes: a pair of left and right front side members that extend along a vehicle body front-rear direction at vehicle width direction outsides of a vehicle body front section; a front bumper reinforcement that is provided spanning between vehicle body front side end portions of the pair of left and right front side members; a projecting member that is provided at an outside wall of one of the front side members further to a vehicle width direction inside than a front wheel and at a location separated in the vehicle body front-rear direction from the front bumper reinforcement, such that the projecting member projects out further towards the vehicle width direction outside than the outside wall, with a rear end portion of the projecting member positioned further to the vehicle body rear side than a vehicle body front side end portion of a power unit disposed in plan view at the vehicle width direction inside of the front side member; and an assistance portion that is formed at the outside wall, and that assists movement of the rear end portion of the projecting member towards the vehicle width direction inside upon input of load to the projecting member.

According to the vehicle body front section structure of the first aspect of the invention, the projecting member is provided at the outside wall of one of the front side members further to the vehicle width direction inside than the front wheel and at a location separated in the vehicle body front-rear direction from the front bumper reinforcement, such that the projecting member projects out further towards the vehicle width direction outside than the outside wall, and with the rear end portion of the projecting member positioned further to the vehicle body rear side than the vehicle body front side end portion of the power unit that is disposed in plan view at the vehicle width direction inside of the front side member. The outside wall of the front side member is moreover formed with the assistance portion that assists movement of the rear end portion of the projecting member towards the vehicle width direction inside upon input of the load to the projecting member.

Accordingly, in the event of a small overlap collision with a barrier further to the vehicle width direction outside than the front side member, when the projecting member collides with the barrier, movement of the rear end portion of the projecting member towards the vehicle width direction inside is assisted, effectively pressing a portion of the front side member towards the vehicle width direction inside. The portion of the front side member therefore efficiently undergoes bending deformation towards the vehicle width direction inside, and an inside wall of the front side member contacts the power unit.

A portion of the load input into the projecting member is accordingly efficiently transmitted to the power unit through the front side member. Lateral force with respect to the vehicle can thus be efficiently generated. Moreover, since the projecting member is provided further towards the vehicle width direction inside than the front wheel, the projecting member can be suppressed or prevented from impinging on the front wheel in the event of a full overlap collision or in the event of an offset collision.

A vehicle body front section structure of a second aspect is the vehicle body front section structure of the first aspect, wherein: the outside wall is divided into an outside wall front portion with a rear flange portion formed at a vehicle body rear side end portion, and an outside wall rear portion with a front flange portion that is formed at a vehicle body front side end portion and joined to the rear flange portion, with the projecting member provided to the outside wall rear portion; and the assistance portion is configured by a joint portion between the front flange portion and the rear flange portion, the joint portion coming apart upon input of the load to the projecting member.

According to the vehicle body front section structure of the second aspect of the invention, the front flange portion of the outside wall rear portion to which the projecting member is provided comes apart from the rear flange portion of the outside wall front portion upon input of the load to the projecting member. Movement of the rear end portion of the projecting member towards the vehicle width direction inside is accordingly effectively assisted, thereby effectively assisting pressing of the front side member towards the vehicle width direction inside. Namely, the generation of lateral force with respect to the vehicle is effectively assisted.

A vehicle body front section structure of a third aspect is the vehicle body front section structure of the first aspect, wherein: the outside wall includes an outside wall rear portion that is provided with the projecting member, and an outside wall front portion that is integrally provided continuously to the vehicle body front side of the outside wall rear portion and that is configured with a thinner plate thickness than the outside wall rear portion; and the assistance portion is configured by a thickness change portion formed at a boundary portion between the outside wall rear portion and the outside wall front portion.

According to the vehicle body front section structure of the third aspect of the invention, the thickness change portion formed at the boundary portion between the outside wall front portion and the outside wall rear portion to which the projecting member is provided breaks upon input of the load to the projecting member. Movement of the rear end portion of the projecting member towards the vehicle width direction inside is accordingly effectively assisted, thereby effectively assisting pressing of the front side member towards the vehicle width direction inside. Namely, the generation of lateral force with respect to the vehicle is effectively assisted.

A vehicle body front section structure of a fourth aspect is the vehicle body front section structure of the first aspect, wherein: the outside wall includes an outside wall rear portion that is provided with the projecting member, and an outside wall front portion that is integrally provided continuously to the vehicle body front side of the outside wall rear portion; and the assistance portion is configured by a weakened portion formed at a boundary portion between the outside wall rear portion and the outside wall front portion.

According to the vehicle body front section structure of the fourth aspect of the invention, upon input of the load to the projection portion, the outside wall rear portion to which the projecting member is provided undergoes bending deformation towards the vehicle width direction inside about the weakened portion formed at the boundary portion of the outside wall rear portion and the outside wall front portion. Movement of the rear end portion of the projecting member towards the vehicle width direction inside is accordingly effectively assisted, thereby effectively assisting pressing of the front side member towards the vehicle width direction inside. Namely, the generation of lateral force with respect to the vehicle is effectively assisted.

A vehicle body front section structure of a fifth aspect is the vehicle body front section structure of the first aspect, wherein: the outside wall includes an inclined wall portion that is diagonally inclined in plan view with respect to the vehicle body front-rear direction and the vehicle width direction, and is formed at the vehicle width direction outside of a front wall of the projecting member.

As described above, the invention according to the first aspect enables lateral force with respect to the vehicle to be generated in an efficient manner in the event of a small overlap collision.

The invention according to the second aspect enables generation of lateral force to be effectively assisted in the event of a small overlap collision.

The invention according to the third aspect enables generation of lateral force to be effectively assisted in the event of a small overlap collision.

The invention according to the fourth aspect enables generation of lateral force to be effectively assisted in the event of a small overlap collision.

BRIEF DESCRIPTION OF THE DRAWINGS

Exemplary embodiments of the present invention will be described in detail based on the following figures, wherein:

FIG. 7 is a plan view cross-section illustrating an outer panel of a front side member configuring a vehicle body front section structure according to the second exemplary embodiment;

FIG. 8 is a perspective view illustrating a vehicle body front section structure according to a third exemplary embodiment; and FIG. 9 is a plan view cross-section illustrating an outer panel of a front side member configuring a vehicle body front section structure according to the third exemplary embodiment.

DETAILED DESCRIPTION

Figure 1:
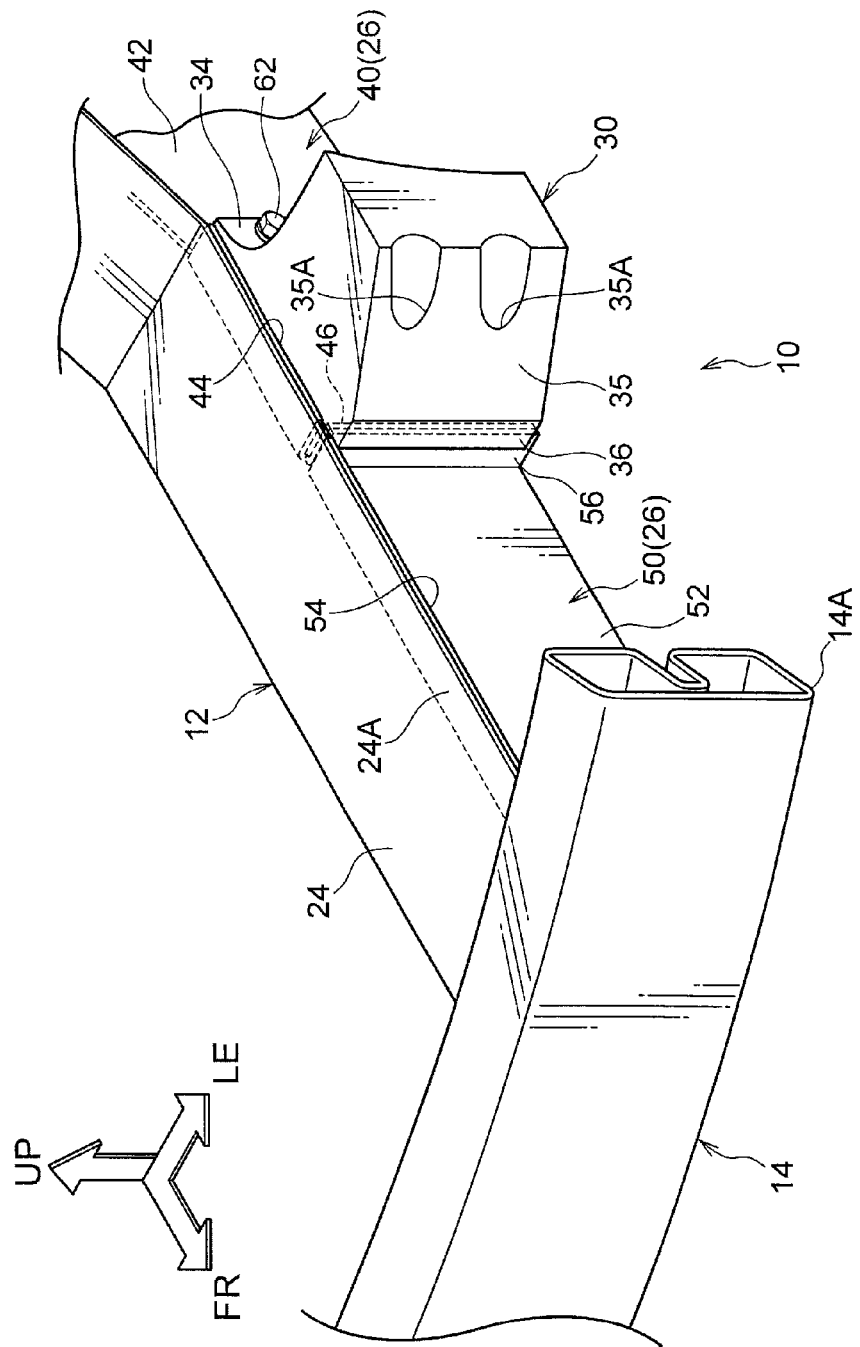
FIG. 1 is a perspective view illustrating a vehicle body front section structure according to a first exemplary embodiment.

Detailed explanation follows regarding exemplary embodiments of the present invention, with reference to the drawings. Note that for ease of explanation, in each of the drawings the arrow UP indicates the vehicle body upwards direction, the arrow FR indicates the vehicle body front direction, and the arrow LE indicates the vehicle body left direction as appropriate. Moreover, in the following explanation, unless specifically indicated reference to the up-down, front-rear, and left-right directions may be understood to refer to up-down in the vehicle body up-down direction, front-rear in the vehicle body front-rear direction, and left and right in the vehicle body left-right direction (width direction). Moreover, each of the drawings illustrates a left side of the vehicle body, however since the right side of the vehicle body is configured similarly but with left-right symmetry, explanation regarding the right side of the vehicle body is omitted as appropriate.

First Exemplary Embodiment

Explanation first follows regarding a first exemplary embodiment. As illustrated in FIG. 1 to FIG. 4, a pair of left and right front side members 12 that extend along the vehicle body front-rear direction are disposed at the vehicle width direction outsides of a vehicle body front section. Front bumper reinforcement 14 that is configured with a substantially rectangular shaped closed cross-section profile and extends along the vehicle width direction is provided at vehicle body front side end portions of the respective front side members 12 through brackets (not illustrated in the drawings). Vehicle width direction end portions 14A of the front bumper reinforcement 14 respectively extend further to the vehicle width direction outsides than the left and right front side members 12.

A power unit 16 that drives at least front wheels 18 and is configured including an engine and a transmission is disposed between the left and right front side members 12. The power unit 16 is supported by an engine mount 20 respectively provided to the left and right front side members 12 through brackets 22.

Figure 2:
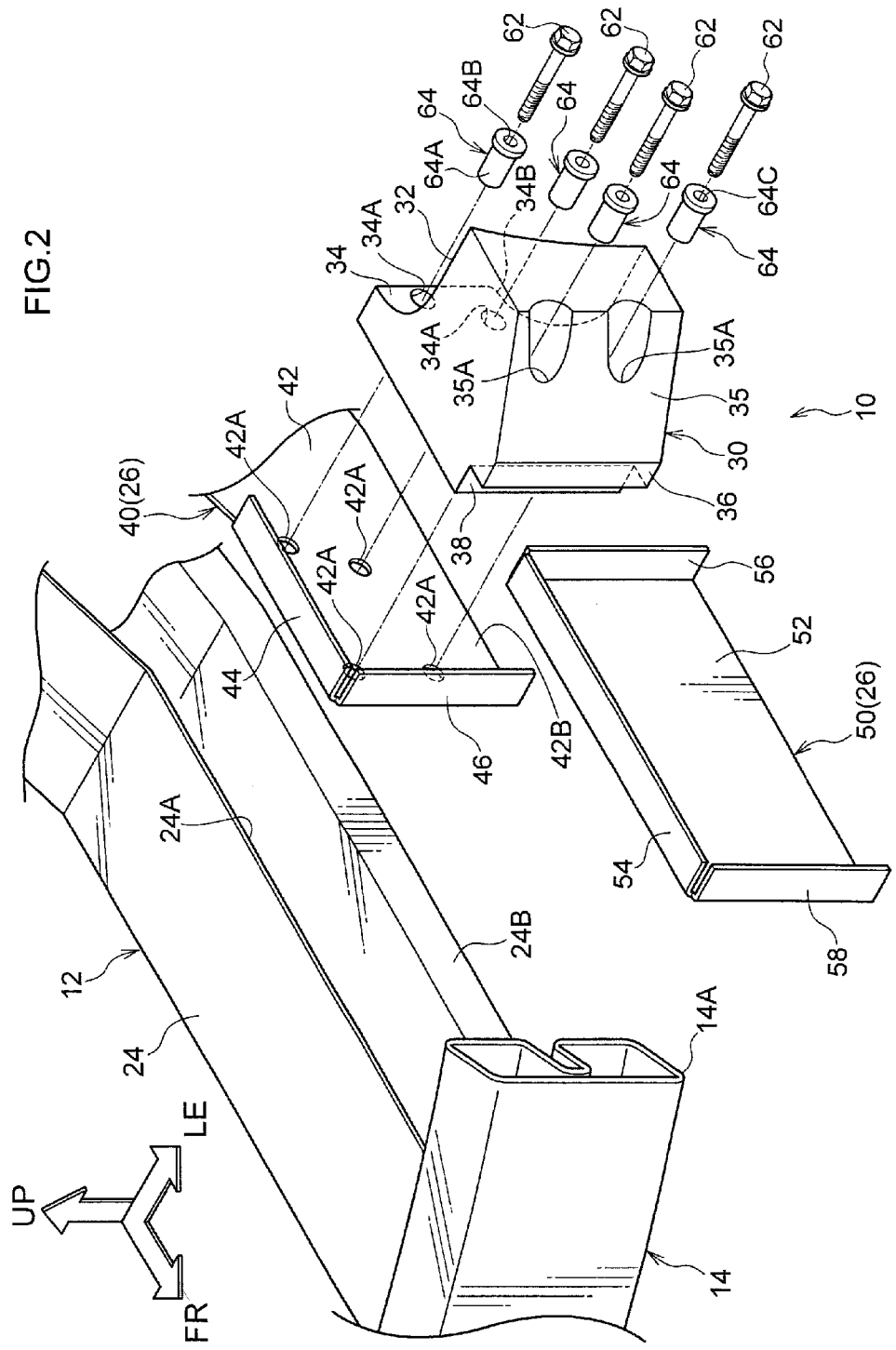
FIG. 2 is an exploded perspective view illustrating an outer panel of a front side member and a projecting member configuring a vehicle body front section structure according to the first exemplary embodiment.

As illustrated in FIG. 2, the respective front side members 12 are configured with closed cross-section profiles by joining an outside wall (referred to below as an outer panel) 26 to an inside wall (referred to below as an inner panel) 24 that has a substantially U-shaped cross-section profile opening towards the vehicle width direction outside. The outer panel 26 is divided into an outer panel rear portion 40 and an outer panel front portion 50. Note that detailed explanation regarding configuration of the outer panel rear portion 40 and the outer panel front portion 50 is given later.

As illustrated in FIG. 1 to FIG. 4, in plan view a front end portion of the outer panel rear portion 40 is provided with a projecting member 30 further to the vehicle width direction inside than an inside plane 18A (imaginary straight line K) of the front wheel 18, the projecting member 30 projecting out further towards the vehicle width direction outside than the outer panel 26. As seen in plan view, the projecting member 30 is formed in a block shape (a substantially pentagonal column shape) that is diagonally cut away at a vehicle width direction outside front end portion. The material of the projecting member 30 is not particularly limited, and may be a metal or a resin provided that it can transmit a load capable of generating a lateral force, described later.

A rectangular flat plate shaped jutting out portion (rear end portion) 34 is integrally formed at the vehicle width direction inside of a rear wall 32 of the projecting member 30 so as to jut out towards the vehicle body rear side. Two through holes 34A (penetrating in the vehicle width direction) are formed one above the other at specific positions in the jutting out portion 34 to allow the insertion of circular cylinder shaped main body portions 64A of flanged collar members 64 from the vehicle width direction outside. Note that the thickness and vehicle front-rear direction length of the jutting out portion 34 are set so as not to impinge on the envelope of the front wheel 18, and a lower end portion of the jutting out portion 34 is configured with a cut away portion 34B that is cut away in a circular arc shape (see FIG. 2).

An inclined wall portion 35 that is diagonally inclined in plan view with respect to the vehicle body front-rear direction and the vehicle width direction is formed at the vehicle width direction outside of a front wall 36 of the projecting member 30. The inclined wall portion 35 is formed with two circular cylinder shaped opening portions 35A (penetrating in the vehicle width direction) one above the other to allow the insertion of flanged collar members 64 from the vehicle width direction outside.

Anchor portions (not illustrated in the drawings) to which flange portions 64B of the collar members 64 are anchored are integrally formed at specific positions of the inner peripheral faces of the respective opening portions 35A. Note that a step portion 38 cut away in a substantially rectangular shape in plan view is formed running along the vehicle body up-down direction at the vehicle width direction inside of the front wall 36 of the projecting member 30.

The outer panel rear portion 40 includes a flat plate shaped main body portion 42, a rectangular flat plate shaped upper flange portion 44 that is integrally provided continuously from an upper end portion of the main body portion 42 so as to jut out towards the vehicle width direction outside, and a rectangular flat plate shaped front flange portion 46 that is integrally provided continuously from a front end portion of the main body portion 42 so as to jut out towards the vehicle width direction outside. The upper flange portion 44 and the front flange portion 46 are configured with similar width to each other.

The upper flange portion 44 is joined by welding to a vehicle width direction outside upper end portion (referred to below as the "upper flange portion") 24A of the inner panel 24, and a lower end portion 42B of the main body portion 42 is joined by welding to a lower flange portion 24B that is integrally provided continuously from a vehicle width direction outside lower end portion of the inner panel 24 so as to jut out towards the vehicle body lower side.

Through holes 42A are formed at specific positions of the main body portion 42 so as to be in communication with the respective through holes 34A (respective through holes 64C of the respective collar members 64) formed in the jutting out portion 34 and the respective opening portions 35A (respective through holes 64C of the respective collar members 64) formed in the inclined wall portion 35. Weld nuts (not illustrated in the drawings) are provided at an inner face of the main body portion 42 so as to be in coaxial communication with the respective through holes 42A.

Configuration is accordingly made such that the projecting member 30 is fastened and fixed to a front end portion of the outer panel rear portion 40 by inserting flange bolts 62 into each of the respective through holes 34A (respective through holes 64C of the respective collar members 64) and the respective opening portions 35A (respective through holes 64C of the respective collar members 64) from the vehicle width direction outside, inserting the respective flange bolts 62 into the respective through holes 42A, and screwing together the flange bolts 62 and the weld nuts.

Note that the fixing technique of the projecting member 30 to the outer panel rear portion 40 is not limited to the flange bolts 62 and the weld nuts, and configuration may for example be made by fixing with an adhesive or with rivets. Configuration may moreover be made by fixing using a combination of the flange bolts 62 and weld nuts and an adhesive.

Figure 4:
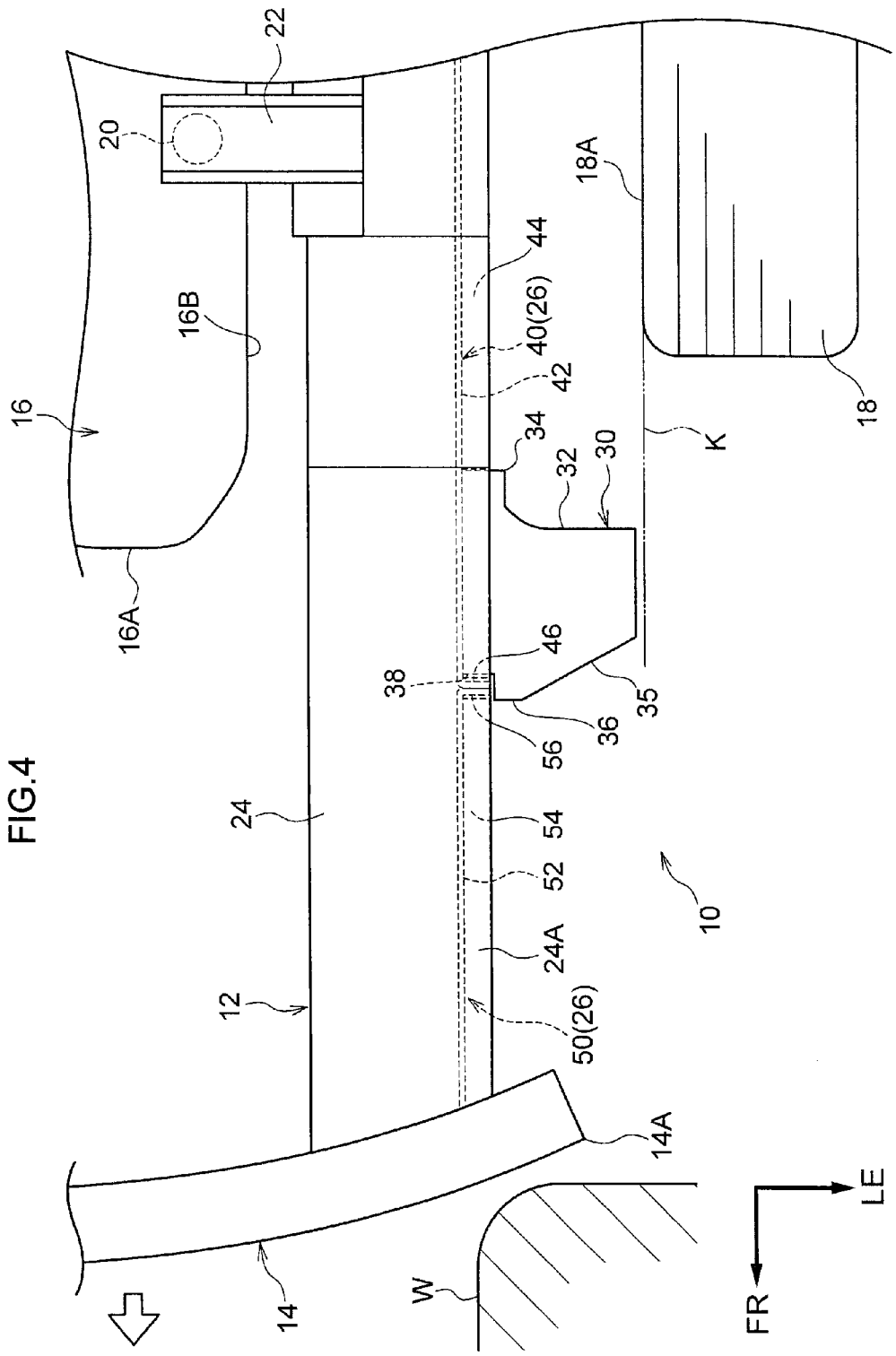
FIG. 4 is a plan view illustrating a state prior to a small overlap collision to a vehicle body front section structure according to the first exemplary embodiment.

In plan view the jutting out portion (rear end portion) 34 of the projecting member 30 that is fastened and fixed to the front end portion of the outer panel rear portion 40 is disposed to the outside of the outer panel 26 of the front side member 12 further to the vehicle body rear side than a vehicle body front side end portion 16A of the power unit 16, and also further to the vehicle body front side than a vehicle body front-rear direction substantially central portion (the engine mount 20) of the power unit 16 (see FIG. 4).

The outer panel front portion 50 includes a rectangular flat plate shaped main body portion 52, a rectangular flat plate shaped upper flange portion 54 that is integrally provided continuously from an upper end portion of the main body portion 52 so as to jut out towards the vehicle width direction outside, a rectangular flat plate shaped rear flange portion 56 that is integrally provided continuously from a rear end portion of the main body portion 52 so as to jut out towards the vehicle width direction outside, and a rectangular flat plate shaped front flange portion 58 that is integrally provided continuously from a front end portion of the main body portion 52 so as to jut out towards the vehicle width direction outside.

The upper flange portion 54, the rear flange portion 56 and the front flange portion 58 are configured with similar width to one another, and the upper flange portion 44 and the front flange portion 46 of the outer panel rear portion 40 are also configured with similar width to one another. The upper flange portion 54 is joined to the upper flange portion 24A of the inner panel 24, and a lower end portion 52A of the main body portion 52 is joined to the lower flange portion 24B of the inner panel 24. The front flange portion 58 is joined to a vehicle width direction outside front end portion (front flange portion: not illustrated in the drawings) of the inner panel 24.

Figure 3:
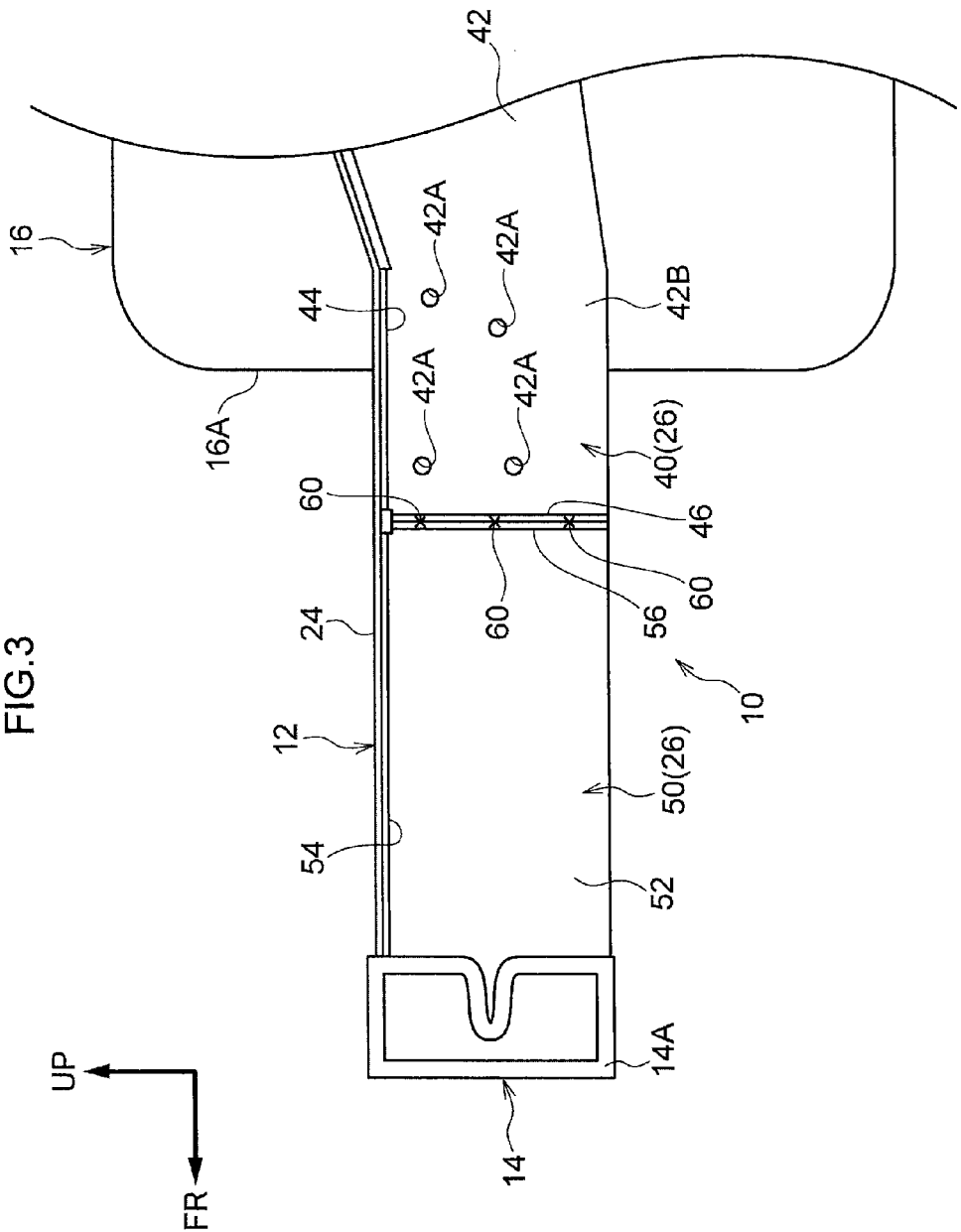
FIG. 3 is a side view illustrating a vehicle body front section structure according to the first exemplary embodiment.

The rear flange portion 56 is moreover joined to the front flange portion 46 of the outer panel rear portion 40. More specifically, as illustrated in FIG. 3 a rear face of the rear flange portion 56 is configured so as to make face-to-face contact with a front face of the front flange portion 46, and the rear flange portion 56 and the front flange portion 46 are joined together at plural locations (for example at 3 locations)

by spot welding at specific intervals in the vehicle body up-down direction therebetween.

Joint portions 60 at the plural locations (for example the 3 locations) serve as an example of an assistance portion of the present exemplary embodiment. Namely, the joint strength of the joint portions 60 is set such that the front flange portion 46 and the rear flange portion 56 come apart from each other upon input of a collision load into the projecting member 30 from the vehicle body front side. Configuration is made such that movement of the jutting out portion 34 of the projecting member 30 towards the vehicle width direction inside is assisted by the front flange portion 46 coming apart from the rear flange portion 56.

Explanation follows regarding operation of a vehicle body front section structure 10 of the first exemplary embodiment configured as described above.

Figure 5:
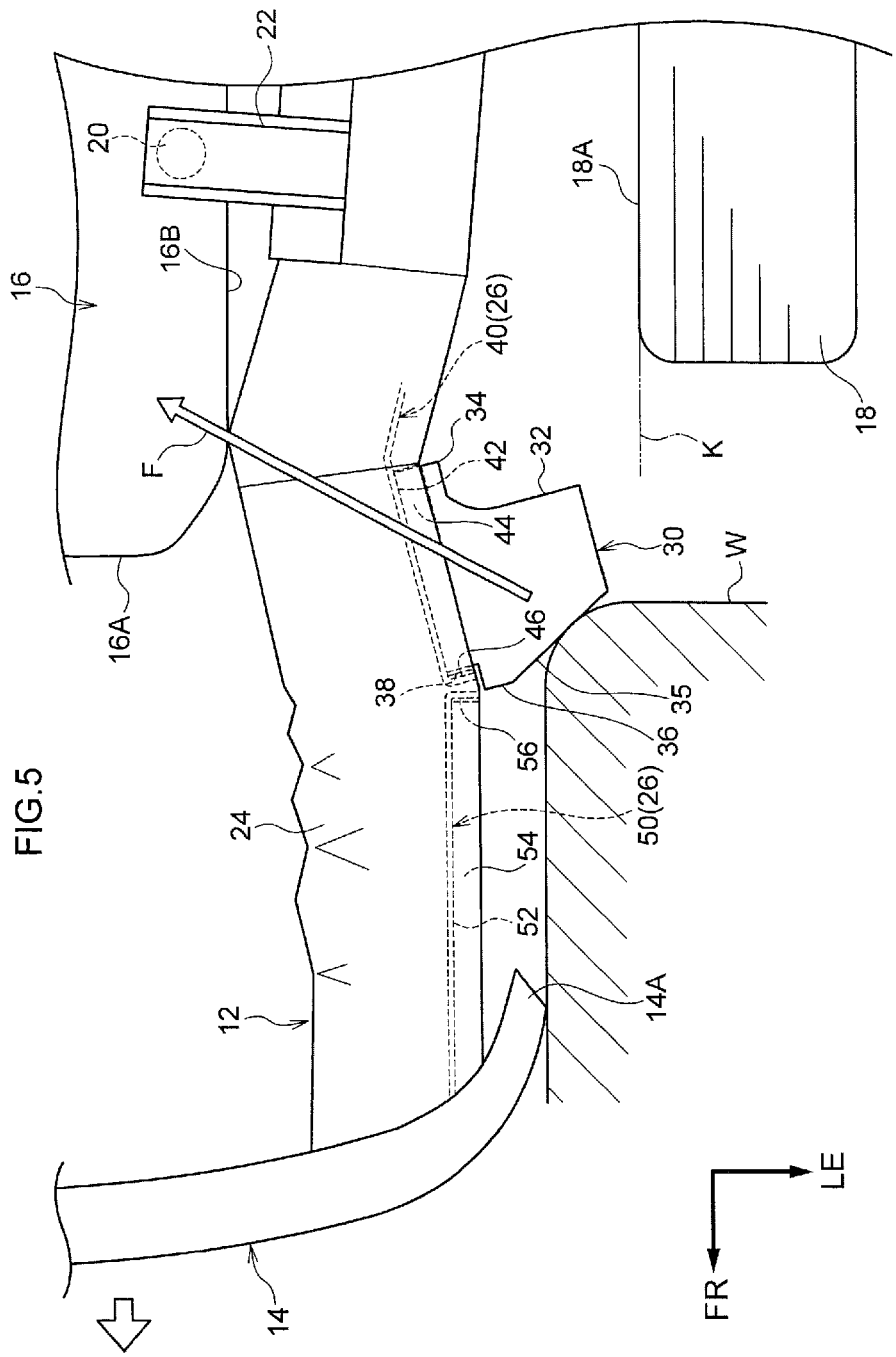
FIG. 5 is a plan view illustrating a state after a small overlap collision to a vehicle body front section structure according to the first exemplary embodiment.

As illustrated in FIG. 4 and FIG. 5, in the event of a small overlap collision for example with a barrier W further to the vehicle width direction outside than the left side front side member 12 of the vehicle, namely wherein the left end portion 14A of the front bumper reinforcement 14 collides with the barrier W, the inclined wall portion 35 of the projecting member 30 that projects out from the outer panel 26 (outer panel rear portion 40) of the left side front side member 12 collides with the barrier W accompanying the forwards progress of the vehicle.

Note that the jutting out portion (rear end portion) 34 of the projecting member 30 is disposed further to the vehicle body rear side than the vehicle body front side end portion 16A of the power unit 16. Accordingly, when the projecting member 30 collides with the barrier W (when a collision load is input into the projecting member 30 from the vehicle body front side) in the event of a small overlap collision, the jutting out portion 34 of the projecting member 30 is relatively pushed in so as to turn towards the vehicle body rear direction inside, and the front flange portion 46 of the outer panel rear portion 40 comes apart from the rear flange portion 56 of the outer panel front portion 50.

Turning (movement) of the jutting out portion 34 towards the vehicle body rear direction inside is thereby assisted, and the jutting out portion 34 efficiently presses a portion of the outer panel rear portion 40 towards the vehicle body rear direction inside. Bending deformation of the front side member 12 towards the vehicle width direction inside is thereby effectively promoted, and a side portion 16B of the power unit 16 is pressed towards the vehicle width direction inside by the inner panel 24 of the bent front side member 12. Namely, a portion of the collision load is efficiently transmitted from the projecting member 30 through the front side members 12 and into the power unit 16 (illustrated by arrow F in FIG. 5).

Moreover, the vehicle width direction outside front end portion of the projecting member 30 is configured with the inclined wall portion 35 that is diagonally inclined in plan view with respect to the vehicle body front-rear direction and the vehicle width direction. Accordingly, a reaction force towards a direction normal to the inclined wall portion 35, namely a component force towards the vehicle width direction inside (the right side in the present example) can be efficiently obtained by the projecting member 30 due to the inclined wall portion 35 colliding with the barrier W.

Reaction force that is received from the barrier W in a small overlap collision can accordingly be easily transmitted to the collision-opposite side (the right side in the present example) by the projecting member 30, and a lateral force with respect to the vehicle (force along the vehicle width direction towards the opposite side to the collision side) can be efficiently generated. The vehicle compartment (occupant space) can accordingly be distanced from the barrier W in the event of a small overlap collision, such that deformation of the vehicle compartment (occupant space) can be suppressed or prevented.

The projecting member 30 is provided further to the vehicle width direction inside than the inside plane 18A (imaginary straight line K) of the front wheel 18 in plan view, thereby enabling the projecting member 30 to be suppressed or prevented from impinging on the front wheel 18 in the event of a full overlap collision or an offset collision of the vehicle.

Second Exemplary Embodiment

Explanation follows regarding a second exemplary embodiment of the present invention. Note that locations similar to those of the first exemplary embodiment are allocated the same reference numerals and detailed explanation thereof (including of the operation) is omitted as appropriate.

Figure 6:
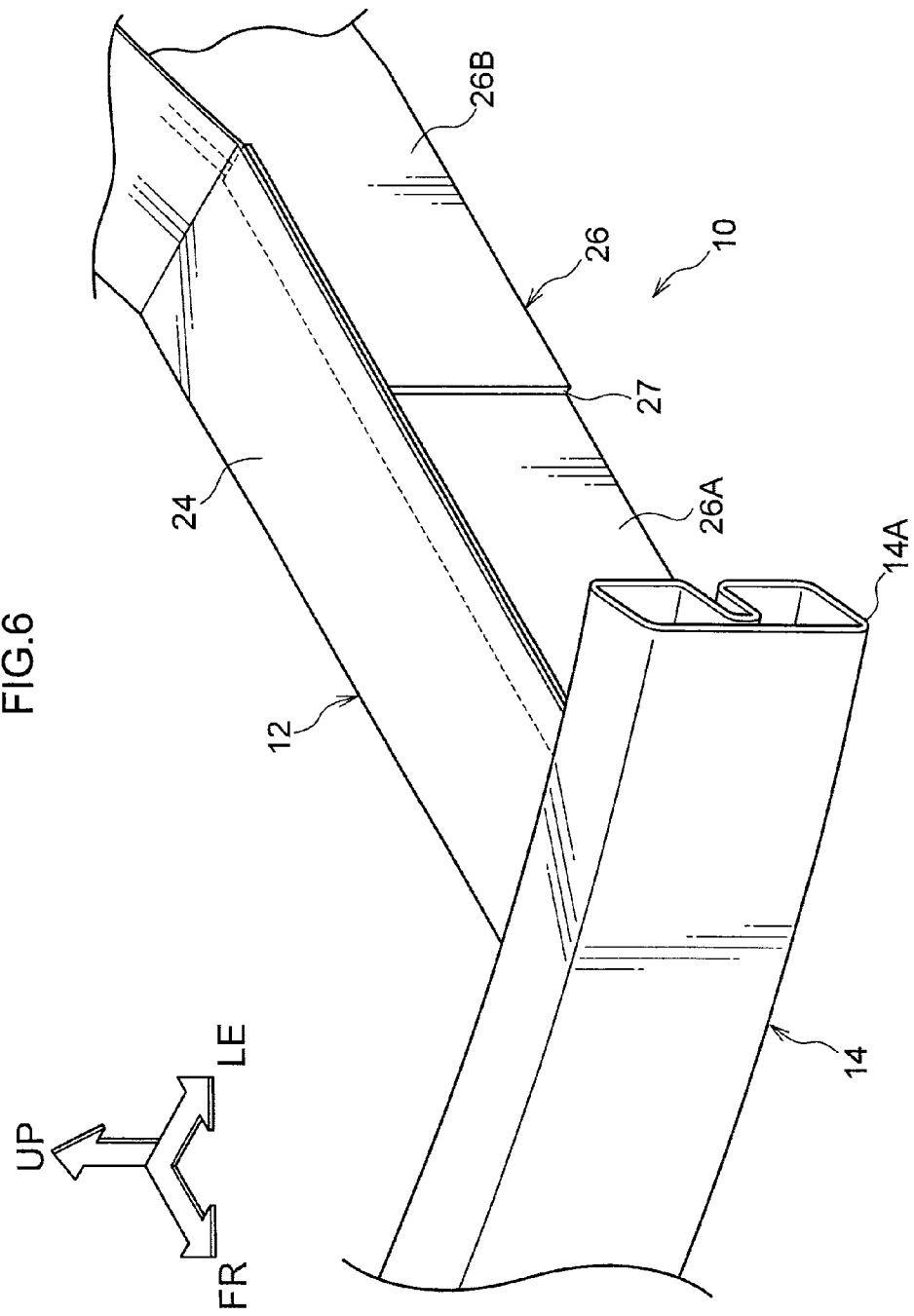
FIG. 6 is a perspective view illustrating a vehicle body front section structure according to a second exemplary embodiment.

As illustrated in FIG. 6 and FIG. 7, unlike in the first exemplary embodiment, the outer panel 26 is not divided into two in the second exemplary embodiment, and a vehicle body front side portion (referred to below as the "outer panel front portion") 26A and a vehicle body rear side portion (referred to below as the "outer panel rear portion") 26B that is further to the vehicle body rear side than the outer panel front portion 26A are configured with different plate thickness to one another.

Namely, in the outer panel 26 of the second exemplary embodiment the plate thickness of the outer panel rear portion 26B to which the projecting member 30 is provided is formed thicker than the plate thickness of the outer panel front portion 26A (the outer panel front portion 26A is configured as a thin plate portion, and the outer panel rear portion 26B is configured as a thick plate portion).

Moreover, a boundary portion between the outer panel front portion 26A and the outer panel rear portion 26B that are integrally formed continuously to one another is configured with a thickness change portion 27 that serves as an example of an assistance portion. Configuration is made such that the thickness change portion 27 breaks running along the vehicle body up-down direction upon input of a collision load to the projecting member 30 from the vehicle body front side.

Namely, configuration is made such that when the projecting member 30 collides with the barrier W, the jutting out portion 34 of the projecting member 30 is relatively pushed in so as to turn towards the vehicle body rear direction inside as seen in plan view, and the thickness change portion 27 breaks. Turning (movement) of the jutting out portion 34 towards the vehicle body rear direction inside is accordingly assisted, and the jutting out portion 34 efficiently presses a portion of the outer panel rear portion 26B towards the vehicle body rear direction inside.

Third Exemplary Embodiment

Explanation follows regarding a third exemplary embodiment of the present invention. Note that locations similar to those of the first exemplary embodiment and the second exemplary embodiment are allocated the same reference numerals, and detailed explanation thereof (including of the operation) is omitted as appropriate.

As illustrated in FIG. 8 and FIG. 9, similarly to in the second exemplary embodiment, the outer panel 26 is not divided into two in the third exemplary embodiment, and a weakened portion, for example a groove portion (snapping bead) 28 is formed between an outer panel front portion 26A of a vehicle body front side portion of the outer panel 26 and an outer panel rear portion 26B of a vehicle body rear side portion of the outer panel 26 as an example of an assistance portion.

A vehicle width direction outside wall face of a boundary portion between the outer panel front portion 26A and the outer panel rear portion 26B that are integrally formed continuously to one another is formed with the groove portion 28 running along the vehicle body up-down direction with a specific depth and with a circular arc shaped profile in plan view. Configuration is made such that upon input of a collision load to the projecting member 30 from the vehicle body front side, a portion of the outer panel rear portion 26B undergoes bending deformation about the groove portion 28 towards the vehicle width direction inside.

Namely, when the projecting member 30 collides with the barrier W, the jutting out portion 34 of the projecting member 30 is relatively pushed in so as to turn towards the vehicle body rear direction inside as seen in plan view. The outer panel rear portion 26B undergoes bending deformation about the groove portion 28 towards the vehicle width direction inside. Turning (movement) of the jutting out portion 34 towards the vehicle body rear direction inside is accordingly assisted, and the jutting out portion 34 efficiently presses a portion of the outer panel rear portion 26B towards the vehicle body rear direction inside.

Explanation has been given regarding the vehicle body front section structure 10 of the present exemplary embodiments based on the drawings, however the vehicle body front section structure 10 of the present exemplary embodiments is not limited to the illustrated examples, and the design thereof may be modified as appropriate within a range not departing from the spirit of the present invention. For example, the vehicle width direction outside of the front wall 36 of the projecting member 30 may be formed with a circular arc wall (not illustrated in the drawings) with a recessed circular arc shaped profile in plan view instead of the inclined wall portion 35 that has a linear profile in plan view.

Moreover, it is sufficient for the joint portions 60 between the front flange portion 46 and the rear flange portion 56 in the first exemplary embodiment to be configured so as to come apart from each other on input of a collision load to the projecting member 30, and there is no limitation to spot welding. Moreover, the thickness change portion 27 of the second exemplary embodiment may be formed with the groove portion 28 of the third exemplary embodiment such that the thickness change portion 27 breaks even more readily.

Moreover, it is sufficient for the weakened portion (assistance portion) of the third exemplary embodiment to be configured such that a portion of the outer panel rear portion 26B readily undergoes bending deformation towards the vehicle width direction inside upon input of collision load to the projecting member 30, and there is no limitation to the groove portion 28. There is moreover no need to position the jutting out portion (rear end portion) 34 of the projecting member 30 further to the vehicle body rear side than the vehicle body front side end portion 16A of the power unit 16 in plan view, provided that the configuration enables load to be transmitted to the power unit 16. Moreover, explanation has been given wherein the vehicle body front section structure 10 of the exemplary embodiments is configured with left-right symmetry, however the configuration does not have to have left-right symmetry.

What is claimed is:

1. A vehicle body front section structure comprising:
    a pair of left and right front side members that extend along a vehicle body front-rear direction at vehicle width direction outsides of a vehicle body front section;
    a front bumper reinforcement that is provided spanning between vehicle body front side end portions of the pair of left and right front side members;
    a projecting member that is provided at an outside wall of one of the front side members further to a vehicle width direction inside than a front wheel and at a location separated in the vehicle body front-rear direction from the front bumper reinforcement, such that the projecting member projects out further towards the vehicle width direction outside than the outside wall, with a rear end portion of the projecting member positioned further to the vehicle body rear side than a vehicle body front side end portion of a power unit disposed in plan view at the vehicle width direction inside of the front side member; and
    an assistance portion that is formed at the outside wall, and that assists movement of the rear end portion of the projecting member towards the vehicle width direction inside upon input of load to the projecting member.

2. The vehicle body front section structure of claim 1, wherein:
    the outside wall is divided into
        an outside wall front portion with a rear flange portion formed at a vehicle body rear side end portion, and
        an outside wall rear portion with a front flange portion that is formed at a vehicle body front side end portion and joined to the rear flange portion, with the projecting member provided at the outside wall rear portion; and
    the assistance portion is configured by a joint portion between the front flange portion and the rear flange portion, the joint portion coming apart upon input of the load to the projecting member.

3. The vehicle body front section structure of claim 1, wherein:
    the outside wall includes
        an outside wall rear portion that is provided with the projecting member, and
        an outside wall front portion that is integrally provided continuously at the vehicle body front side of the outside wall rear portion and that is configured with a thinner plate thickness than the outside wall rear portion; and
    the assistance portion is configured by a thickness change portion formed at a boundary portion between the outside wall rear portion and the outside wall front portion.

4. The vehicle body front section structure of claim 1, wherein:
    the outside wall includes
        an outside wall rear portion that is provided with the projecting member, and
        an outside wall front portion that is integrally provided continuously at the vehicle body front side of the outside wall rear portion; and
    the assistance portion is configured by a weakened portion formed at a boundary portion between the outside wall rear portion and the outside wall front portion.

5. The vehicle body front section structure of claim 1, wherein:
    the outside wall includes an inclined wall portion that is diagonally inclined in plan view with respect to the vehicle body front-rear direction and the vehicle width direction, and is formed at the vehicle width direction outside of a front wall of the projecting member.

* * * * *